United States Patent [19]
McIntosh et al.

[11] 3,920,836
[45] Nov. 18, 1975

[54] SANITIZING PLASTIC MATERIAL

[75] Inventors: Robert H. McIntosh; Ezekiel H. Hull, both of Greensboro, N.C.

[73] Assignee: Anthony B. Askew, Atlanta, Ga.

[22] Filed: Dec. 21, 1973

[21] Appl. No.: 427,382

Related U.S. Application Data

[60] Continuation of Ser. No. 292,792, Sept. 27, 1972, abandoned, which is a division of Ser. No. 139,265, April 30, 1971, Pat. No. 3,705,235.

[52] U.S. Cl. .............................................. 424/315
[51] Int. Cl.$^2$ ........................................ A61L 13/00
[58] Field of Search ................................... 424/315

[56] References Cited
UNITED STATES PATENTS
3,705,235  12/1972  McIntosh et al. .................. 424/83

OTHER PUBLICATIONS
CA.75:80266c; CA.67:4048c, 84849c, 107597k, CA.63:6043d, CA.56:15618d.
CA.74:32348b, 76945k, CA.69:67971k, CA.63:8624h, CA.60:13402G, CA.58:15518g.

Primary Examiner—Shep K. Rose
Attorney, Agent, or Firm—Jones, Thomas & Askew

[57] ABSTRACT

An effective amount of nonionic trialkyl amine and optionally one of a Group II-A or Group II-B metal salt of a monocarboxylic acid having a carbon chain length of 1 to 4, cadmium chloride, or ethylenediaminetetraacetic acid when dispersed in a thermoplastic resin is an effective and long lasting fungicidal and bactericidal agent which is effective against both Gram positive and Gram negative organisms including *pseudomonas aeruginosa*.

7 Claims, No Drawings

SANITIZING PLASTIC MATERIAL

This application is a continuation of application Ser. No. 292,792 filed Sept. 27, 1972, now abandoned which was a division of application Ser. No. 139,265, filed Apr. 30, 1971, now U.S. Pat. No. 3,705,235.

This invention relates to a self-sanitizing plastic material and to the sanitizing additive which is incorporated into a plastic material to produce self-sanitizing characteristics in that material. More particularly, the present invention concerns a plastic material and an additive for use therein which will destroy or significantly reduce over a long period of time both Gram negative and Gram positive bacteria including *Pseudomonas aeruginosa*.

Through the present invention there is provided a self-sanitizing plastic material, and a method of preparation thereof, which is effective in killing or significantly inhibiting the growth of disease and infection-producing micro-organisms which come into contact with the surfaces of an article prepared from the plastic material. The plastic produced according to this invention can be utilized in a manifold number of molded objects which are designed to come within contact of the human skin. The term "molded" as used in this application is used in its broad sense to include forming generally under the usual high temperatures encountered in organic plastic-making techniques and encompasses other obvious forming methods such as potting, extruding, sheeting and the like. This self-sanitizing plastic material is of incalculable value in applications where the plastic comes into contact with the skin of a human being or the mouth through the prevention of passage of many germs or disease-producing micro-organisms to the body.

The self-sanitizing plastic of this invention has the capacity to kill many types of bacteria, streptococci, fungi, and other disease-producing and infection-producing micro-organisms which might come into contact with the surface of a molded object prepared from the material. Such micro-organisms are those which commonly cause communicable diseases, and in general the self-sanitizing plastic is fatal to organisms which are classified bacteriologically as Gram positive or Gram negative. In addition, the plastic is specifically deadly to such organisms as *Pseudomonas aeruginosa*.

The plastic material of this invention has the further ability to maintain its efficacy after repeated washings, such as would be commonly employed in many applications. The longevity is measured in a period of time which generally outlasts the life of most applied usages of the plastic.

Accordingly, it is a primary object of the present invention to provide a plastic material which has a self-sanitizing characteristic over a period of time normally coextensive with the usable life of objects prepared from the plastic material.

Another object of the present invention is the provision of a self-sanitizing plastic material which may be used by human beings with no toxic or irritating effects.

Another object of the present invention is the provision of a self-sanitizing and non-toxic plastic material which may be prepared into a number of physical shapes using conventional construction techniques.

Another object of the present invention is to provide a sanitizing additive which may be formulated with thermoplastic materials and will not degrade or otherwise reduce the physical properties of the plastic material during fusion of the plastic material and subsequent use thereof.

These and other objects, features and advantages of the present invention will become apparent from a review of the following detailed description.

According to the present invention a self-sanitizing thermoplastic material is provided for use in the manufacture of mattress covers, crib covers, bassinet covers, draw sheets, cubicle curtains, pillow covers, emesis basins, toilet seats, shower curtains, male and female urinals, bed pans, bed pan liners, wash basins, carafes, tooth brushes, hair brushes, combs, soap holders, denture cups, rolls of utility sheeting, catheters, drainage bags, colostomy pouches, ileostomy pouches, IV solution bags, irrigation solution bags, blood bags, tubing, administration sets, donor sets, fountain syringes, enema bags, contact lens holders, examination equipment covers for all classes of trade including a medical doctor, veterinarian, dentist, optometrist, opthamologist, and optician, moisture barrier for the building trade to eliminate mold and mildew, table tops, food handling trays, wall paneling, floor covering, carpet base, shower curtains, bath mats, and telephone caps for mouth piece and reception unit.

The thermoplastic material of this invention includes a sanitizing additive which is uniformly dispersed throughout the material. One of the most interesting and important features of this plastic material is its unique ability to release the sanitizing additive uniformly over the surface of articles formed from the material and to replace the sanitizing additive when the surface concentration of the additive has been reduced. The additive is homogeneously distributed throughout the plastic material. The additive migrates through the body of the plastic material to continuously replenish the supply of additive on the surface of the plastic material to assure a long lasting surface concentration sufficient to inhibit bacterial and fungal growth. Studies have shown that even after an article is wiped or washed with soaps and detergents, the antibacterial and anti-fungal life span of the article is compatible with the normally anticipated useful life of the article.

It has been found that the active sanitizing additive migrates to the surface of the thermoplastic article at a rate sufficient to maintain a level of concentration that will inhibit the growth of a wide spectrum of common bacteria and fungi. Growth of the following organisms, including both Gram-negative and Gram-positive bacteria, has been found to be inhibited by the present self-sanitizing plastic material: *Sarcina lutea, Staphylococcus aureus, Staphylococcus albus, Pseudomonas aeruginosa, Escherichia coli, Klebsiella, Candida albitans, Salmonella chloreasius, Enterobacter aerogenes, Escherichia communior, Streptococcus pyogenes*.

The sanitizing additive of the present invention is a nonionic trialkyl amine and optionally one of a Group II-A or Group II-B (from the Periodic Table) metal salt of a monocarboxylic acid having a carbon chain length of 1 to 4, cadmium chloride, or ethylenediaminetetraacetic acid. Suitably, the trialkyl amine includes two alkyl groups which have a carbon chain length of 1 to 4 atoms and one alkyl group which has a carbon chain length of 8 to 18 atoms. Preferably, the trialkyl amine is a dimethylalkyl amine wherein the alkyl group has from 10 to 14 carbon atoms. The most preferred amine in this invention is dimethyllaurylamine.

Suitably, the Group II-A or Group II-B metal salt of a monocarboxylic acid includes the barium, cadmium and strontium salts of acetic acid, propionic acid and butyric acid. The most preferred of these salts is barium acetate.

The most preferred sanitizing additive is a mixture of dimethyllaurylamine and barium acetate in a part by weight ratio range of 1:2 to 2:1 for acetate to amine. A preferred part by weight ratio range for acetate to amine is 70 to 50 parts by weight to 30 to 50 parts by weight. A most preferred part by weight ratio is 60 parts amine to 40 parts acetate.

When blending the additive into a plastic material, a suitable concentration is 0.5% to 10% of additive in plastic by weight. A preferred concentration is 2% to 9% and a particularly preferred concentration is 3% to 7% by weight.

In preparing the amine-acetate sanitizing additive for incorporation into a plastic material, a mixture of dimethyllaurylamine and barium acetate is most preferred. Granular barium acetate, of a particle size of approximately minus 4 mesh (U.S. Standard Screen Size), is added to an oily liquid dimethyllaurylamine in a part by weight ratio as previously discussed in a ball mill. The ball mill tumble-mixes and grinds the mixture to a point where the particle sizes of the granular barium acetate are reduced sufficiently for the barium acetate to remain in suspension in the amine. Generally speaking, the acetate is reduced from minus 4 mesh to minus 325 mesh in the ball milling operation.

An appropriate amount of the amine-acetate suspension is then added to a tumble-mixing machine containing a sufficient weight of thermoplastic pellets to produce a concentration of sanitizing additive in plastic as discussed previously. During the tumble mixing operation the oily amine provides a filmy coating on the plastic pellets which holds the ground acetate on the pellets. As a result, the amine-acetate suspension adheres to the pellets during the tumbling operation and there is no accumulation or run-off of the amine-acetate suspension. The suspension adheres to such a degree that the coated pellets may be stored for a reasonable period of time without run-off or separation of the suspension from the pellets.

It has been found that thermoplastic materials are suitable for use in the present invention. Of the available thermoplastics, polyolefins are preferred and polyethylene and polypropylene are particularly preferred. When mixing the thermoplastic material with the amine-acetate suspension, it is preferred that the plastics be initially in pellet form of approximately 1/16th to ⅛th of an inch in diameter. Pelletized plastics are conventionally available from a number of suppliers.

After an appropriate amount of sanitizing additive is mixed with and coated on a sufficient quantity of pelletized plastic material, the mixture is charged to a hopper of a conventional melt extruder where the mixture is melted and the sanitizing additive is homogeneously distributed throughout the melted mass by the action of the extruder. The resultant molten mass of plastic material may be formed into a desirable shape such as disclosed previously. The molten mass may be formed into a sheet of plastic film and when such is done the sheet is even in texture, translucent and contains a uniform dispersion of the additive.

During the fusing operation in the melt extruder, temperatures as high as 230°C may be employed without degradation of the sanitizing additive. Preferably, the fusion temperature should be between about 150°C to 200°C. The sanitizing additive of this invention is quite advantageous for use in thermoplastics because it can withstand the heats of fusion required for most typical thermoplastics whereas known sanitizing additives tend to degrade and discolor at these temperatures.

It has also been found that the molten mass from the melt extruder may be passed through a conventional spinneret to generate thermoplastic fibers containing the sanitizing additive. These fibers may be gathered together to form conventional threads and yarns for numerous uses.

The present invention will be further described by the following examples:

EXAMPLE I

To 90 parts of polyethylene pellets is added 10 parts of a sanitizing additive comprising equal amounts of dimethyllaurylamine and barium acetate. The pellets are coated with the oily suspension by tumbling mixing for 20 minutes. The coated pellets are fused in test tubes immersed in an oil bath at a temperature of 190°C to 202°C for 20 minutes. Upon subsequent cooling to ambient temperature, the plastic cylinders from the test tubes are removed and sawed into discs approximately 10 mils in thickness. No degradation of the polyethylene is noted. The discs are placed within appropriately impregnated petri dishes containing a nutrient agar. It is found upon incubation of the dishes that the discs inhibit the growth of bacteria and fungi around the discs and create a zone of inhibition. The results for the listed organisms are as follows:

TABLE A

| ORGANISM | ZONE OF INHIBITION IN MILLIMETERS |
|---|---|
| Sarcina Lutea | Complete inhibition throughout petri dish |
| Staph. Aureus | 11 |
| Pseudomonas Aeruginosa | 5 |
| E. Coli | 5 |
| Klebsiella | 18 |
| Candida Albicans | 8 |
| Salmonella Choleraesius | 35 |

EXAMPLE II

The procedure of Example I is repeated except that equal parts of ethylenediaminetetraacetic acid and dimethyllaurylamine are used as the sanitizing additive. The results obtained are as follows:

TABLE B

| ORGANISM | ZONE FOR INHIBITION IN MILLIMETERS |
|---|---|
| Sarcina Lutea | 9 |
| Staph. Aureus | 7 |
| Pseudomonas, Aeruginosa | 5 |
| E. Coli | 5 |
| Klebsiella | 9 |
| Candida Albicans | 7 |
| Salmonella Choleraesius | 10 |

EXAMPLE III

The procedure of Example I is repeated except that equal parts of cadmium chloride and dimethyllauryl amine are used as the sanitizing additive. The results obtained are as follows:

TABLE C

| ORGANISM | ZONE FOR INHIBITION IN MILLIMETERS |
| --- | --- |
| Sarcina Lutea | 10 |
| Staph. Aureus | 10 |
| Pseudomonas Aeruginosa | 10 |
| E. Coli | 10 |
| Klebsiella | 15 |
| Candida Albicans | 23 |
| Salmonella Choleraesius | 45 |

While this invention has been described in detail with particular reference to preferred embodiments thereof, it will be understood that variations and modifications can be effected within the spirit and scope of the invention as described hereinbefore and as defined in the appended claims.

We claim:

1. A sanitizing agent capable of destroying or inhibiting the growth of both Gram negative and Gram positive bacteria, fungi and *Pseudomonas aeruginosa*, said agent consisting essentially of a mixture of a nonionic trialkylamine and a compound selected from the group consisting of a Group II-A or Group II-B metal salt of a monocarboxylic acid having a carbon chain length of 1 to 4.

2. A sanitizing agent according to claim 1 wherein said agent consists essentially of a mixture of dimethyllaurylamine and barium acetate in a part by weight ratio within the mixture of 1:2 to 2:1.

3. A sanitizing agent according to claim 1, wherein the trialkyl amine consists essentially of two alkyl groups having a carbon chain length of 1 to 4 atoms and one alkyl group having a carbon chain length of 8 to 18 atoms, and the Group II-A or Group II-B metal salt of a monocarboxylic acid consists essentially of a compound selected from the group consisting of barium, cadmium and strontium salts of acetic acid, propionic acid, and butyric acid or mixtures thereof.

4. A sanitizing agent as disclosed in claim 1, wherein the sanitizing agent consists essentially of a mixture of dimethyllaurylamine and barium acetate.

5. A sanitizing agent as disclosed in claim 1, wherein the agent consists essentially of a mixture of dimethyllaurylamine and barium acetate in a part by weight ratio for acetate to amine of 70 to 50 parts by weight acetate to 30 to 50 parts by weight amine.

6. A sanitizing agent as disclosed in claim 1, wherein the agent consists essentially of a mixture of dimethyllaurylamine and barium acetate in a part by weight ratio for acetate to amine of 40 parts to 60 parts.

7. A thermoplastic self-sanitizing additive consisting essentially of a mixture of barium acetate and dimethyl lauryl amine in a part by weight ratio of 1:2 to 2:1 for amine to acetate, said additive being effective, notwithstanding high manufacturing temperatures encountered of 150°C to 200°C which tend to degrade or discolor known sanitizing additives, to impart self-sanitizing characteristics to the thermo-plastic material and to be efficacious, after repeated washings, to inhibit the growth of a wide spectrum of common bacteria and fungi for a period of time following manufacture of articles from the material.

* * * * *